USO05314075A

United States Patent [19]

Nguyen et al.

[11] Patent Number: 5,314,075
[45] Date of Patent: May 24, 1994

[54] ADJUSTABLE POPCORN STRAINER

[76] Inventors: Caroline P. Nguyen, 980 Kiely Blvd., #119; James M. Harrell, Jr., 990 Kiely Blvd., #E, both of, Santa Clara, Calif. 95051

[21] Appl. No.: 18,274
[22] Filed: Feb. 16, 1993
[51] Int. Cl.[5] ............................................. B07B 1/49
[52] U.S. Cl. .................................. 209/680; 209/417
[58] Field of Search ............................ 209/417-419, 209/680, 683, 398, 305, 235, 614; 99/323.4, 323.5, 323.11

[56] References Cited

U.S. PATENT DOCUMENTS

| 337,550 | 3/1886 | Beneke | 209/419 |
| 681,608 | 8/1901 | Baughman | 209/419 |
| 2,522,343 | 9/1950 | Canfield | 209/418 X |
| 4,003,522 | 1/1977 | Buckley | 241/95 |
| 4,457,435 | 7/1984 | Truman | 99/323.11 X |
| 4,942,277 | 7/1990 | Narberes | 209/417 X |
| 5,215,196 | 6/1993 | Valls | 209/417 |

FOREIGN PATENT DOCUMENTS 266597 2/1950 Switzerland ................ 209/417

Primary Examiner—D. Glenn Dayoan
Attorney, Agent, or Firm—Fliesler, Dubb, Meyer & Lovejoy

[57] ABSTRACT

An Adjustable Popcorn Strainer which separates partially popped and unpopped popcorn kernels from fully popped popcorn. These partially popped and unpopped kernels can be hazardous to the teeth and are generally unpleasant to eat. The strainer holes are adjustable allowing the desired kernel size to be passed through the strainer.

1 Claim, 3 Drawing Sheets

ADJUSTABLE POPCORN STRAINER

BACKGROUND OF THE INVENTION

1. Field of the Invention

The subject invention generally pertains to kitchen utensils and more specifically to food strainers and colanders.

2. Description of Related Art

Most food strainers and colanders existing on the market today cannot be used to separate small partially popped and unpopped kernels from a batch of fully popped popcorn. Most strainers and colanders are normally used to clean food products by pouring water over the food and through the colander. In addition, there does not appear to be an adjustable strainer on the market which can pass a range of smaller kernel sizes, leaving the larger popped kernels inside the strainer.

SUMMARY OF THE INVENTION

To avoid the limitations and problems associated with popcorn strainers and colanders, it is an object of the subject invention to separate the unpopped popcorn kernels from the larger popped kernels.

Another object of the subject invention is to provide adjustable passage holes in the strainer to separate a desired range of smaller and partially popped popcorn kernels from the larger popped kernels.

Another object of the subject invention is to allow the separation of popcorn kernels through the use of hand agitation.

DESCRIPTION OF PREFERRED EMBODIMENT

Figure 1:
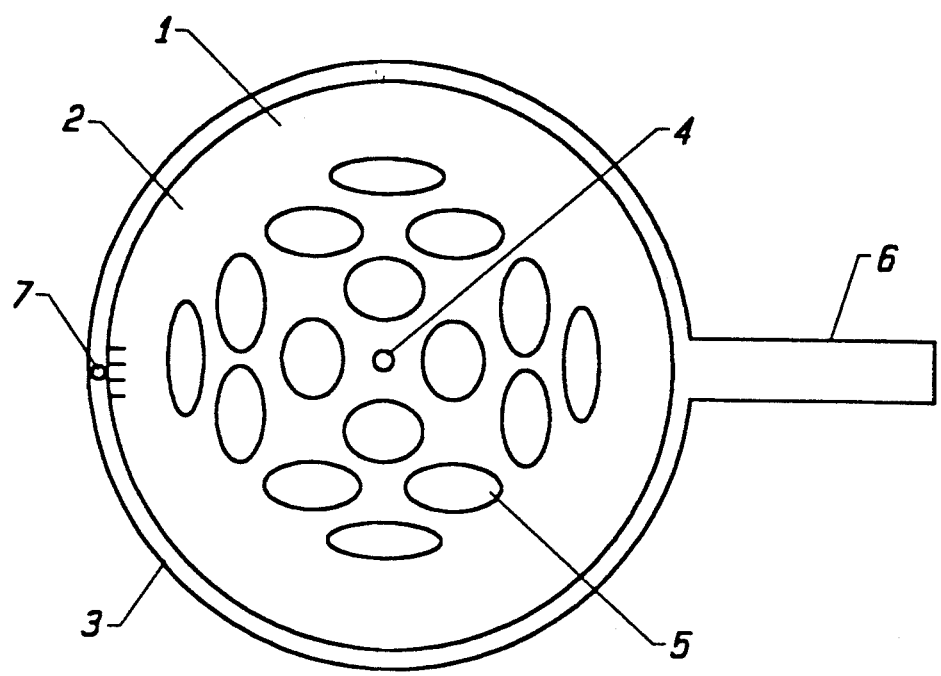
FIG. 1 illustrates a top view of the Adjustable Popcorn Strainer.
Figure 2:
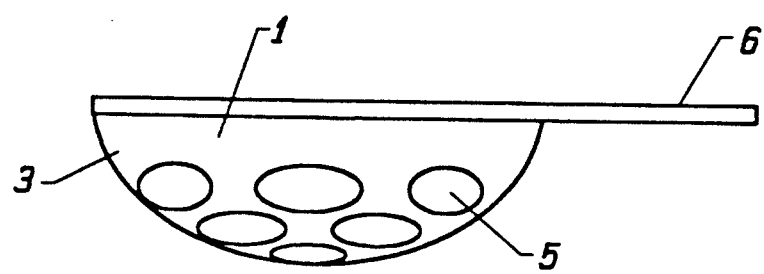
FIG. 2 illustrates a side view of the Adjustable Popcorn Strainer.

Referring to FIG. 1 and 2, an Adjustable Popcorn Strainer 1, includes an inner strainer 2 and an outer strainer 3 loosely connected together by means of fastener 4. Both inner strainer 2 and outer strainer 3 contain identical passage hole patterns 5 large enough to pass large popped popcorn kernels. Outer strainer 3 is connected to the handle 6 and hole size indicator 7.

Figure 3:
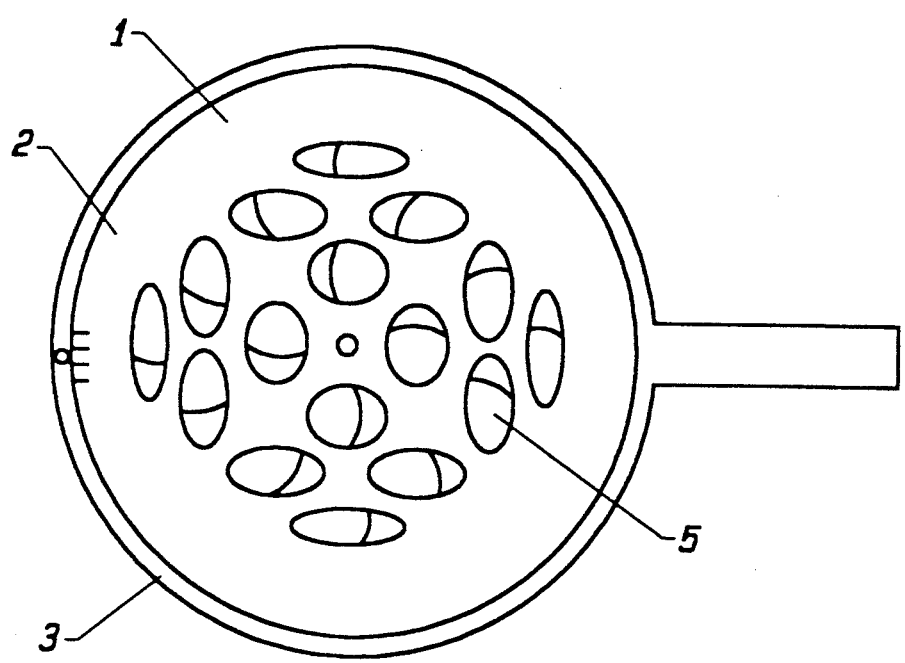
FIG. 3 illustrates a top view of the Adjustable Popcorn Strainer as rotated with hole pattern partially closed.

Referring to FIG. 3, an Adjustable Popcorn Strainer 1, with inner strainer 2 and an outer strainer 3 rotated relative to each other allowing effective size of passage holes 5 to be reduced.

In operation, inner strainer 2 is rotated with respect to outer strainer 3, such that passage holes 5 overlap and become effectively smaller allowing partially popped and unpopped kernels to pass through strainer 1.

Another embodiment of the invention is to utilize one strainer with one size of permanent holes which could range from $\frac{1}{4}''$ to $1''$ in diameter.

Another embodiment of the invention is to utilize the Adjustable Popcorn Strainer with an electric popcorn maker. The strainer would be inverted over the popcorn maker while popcorn is being made and then used as described above after the popcorn is done. While the popcorn is being made the adjustable holes in the strainer would need to be completely closed off, thus containing the popcorn.

Although the invention is described with respect to a preferred embodiment, modifications thereto will be apparent to those skilled in the art. Therefore, the scope of the invention is to be determined by reference to the claims which follow:

We claim:

1. An Adjustable Popcorn Strainer for separating partially popped and unpopped popcorn from a batch of fully popped popcorn, comprising:
    an outer strainer containing holes;
    an inner strainer containing holes;
    a handle connected to said outer strainer; and
    a fastener which joins both said inner and said outer strainers allowing them to rotate with respect to each other such that the effective size of the holes can be reduced,
    one of said inner and outer strainers comprising a scale and the other of said inner and outer strainers comprising a pointer so as to provide an indication of effective hole size.

* * * * *